Jan. 4, 1938.　　　L. L. MILES　　　2,104,207
AIRCRAFT PROPELLER
Filed April 4, 1936

Loren L. Miles.

INVENTOR.

Patented Jan. 4, 1938

2,104,207

UNITED STATES PATENT OFFICE 2,104,207

AIRCRAFT PROPELLER

Loren L. Miles, Los Angeles, Calif.

Application April 4, 1936, Serial No. 72,729

8 Claims. (Cl. 170—159)

Figure 1:
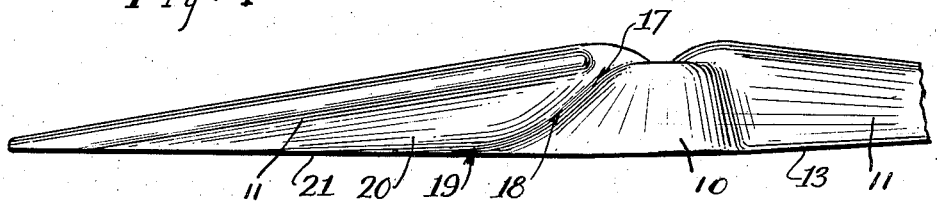
Figure 2:
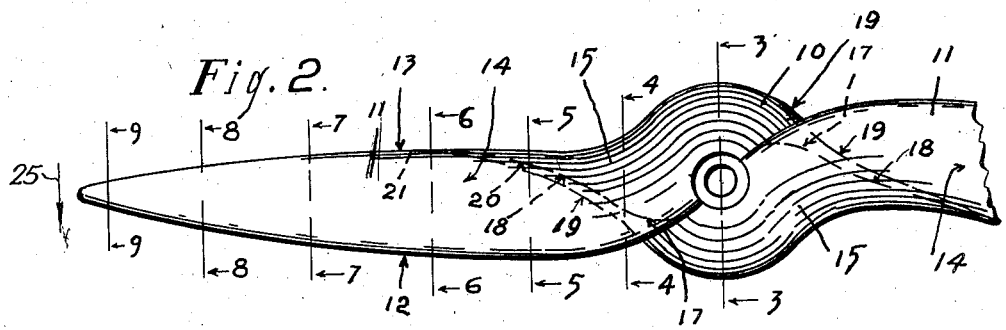
Figure 3:
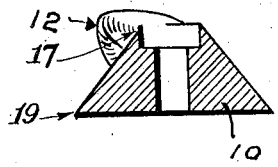
Figure 4:
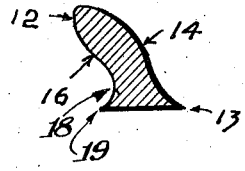
Figure 5:
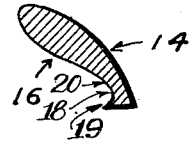
Figure 6:
Figure 7:
Figure 8:
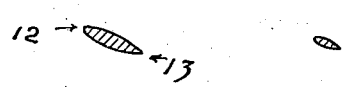
Figure 9:

My invention relates to improvements in aircraft propellers in which the air is distributed so as to act on the larger part of the whole propeller; and the objects of my invention are, first, to provide means whereby air approaching at the center of the hub is deflected to pass towards the ends of the propeller blades; second, to provide means whereby so deflected air is directed to act at most effective points of the blades; third, to provide a propeller most suitable and efficient for such actions, to result in a minimum loss of power, in general, and, particularly, near the hub; fourth, to provide a propeller designed to efficiently cooperate with other parts of an aircraft, such as the engine body, in front of or following the propeller, depending on the general arrangement of different aircraft, and subject to different velocities at which different propellers of different aircraft may be operated; and with other objects readily to be visualized and realized from the following description and claims with reference to the illustrations in the drawing, in which—Fig. 1 is a fragmental side elevation of a propeller designed according to this invention; Fig. 2 is a fragmental front elevation of the propeller; and Figs. 3, 4, 5, 6, 7, 8, and 9 are cross sections taken on the lines indicated in Fig. 2.

Having had in mind a propeller that will satisfy the very varied conditions of different aircraft with respect to load (dead-load and weight to be carried) and speed of light-weight racing aircraft as well as of slow-moving heavy cargo-carrying aircraft, and to otherwise satisfy the different requirements and different ideas of different designers; any distribution of air, to act efficiently on the propeller, must naturally be with respect to the varied revolutions per minute at which the propeller may be operated, if the propeller is to give the results according to this invention, and, therewith, with respect to the linear velocity of any point of a propeller.

Any propeller, to be efficient, must also be designed with airfoil cross sections, and, though airfoil cross sections are not exactly unknown in aircraft propellers, this principle is largely applied to the central and end parts of a propeller only.

Here, however, a propeller has been designed under the principles of airfoil cross section throughout its whole structure.

That points close to the center operate at considerable smaller linear velocity than points near the ends or tips of the blades at any given revolution per minute of one and the same propeller, should be no reason to consider these points close to the center as negligible, though, perhaps, less effective, and the present invention provides therefore a structure facilitating a utilizing of the center portions as well as the outer portions of a propeller.

Not only the portions of the blades close to the hub, but even the hub itself are therefore designed to conform to the desired principles and advantages, and the central portions of the blades are accordingly not only steep, but also deep, and, furthermore, designed in a particular manner.

Considering, however, the generally smaller linear velocity of points of the propeller near the hub and, thereby, the smaller capacity of utilizing the amount of air per square inch approaching any and all of the points of any propeller, provisions have been made to transfer any surplus of air from the central portions to any portions of the propeller blades that can more efficiently utilize such air.

Considering also that the general construction of aircraft makes it practically impossible that even a proportionate amount of air can be utilized by the central portions of an aircraft propeller, due to the fact that close behind or in front of the central portions of a propeller are practically always large bodies, such as the motor, fuselage, cowling, or nose, the referred to provisions have even been intensified accordingly.

These provisions and arrangements not only reduce undue waste of air but also increase the effective power of any propeller constructed according to this invention.

From the above it must be understood that the length of a blade, the diameter of a propeller, the revolution per minute at which any propeller may be operated, are necessarily the controlling factors, but that the speed of the aircraft at which it is propelled through the air, light racing aircraft, or heavy slow moving craft, nose, cowling, fuselage, and eventually other factors cannot be ignored in the design of the propeller.

Air can for such several reasons only be transferred from the central portions to portions at greater radii up to points before it creates drag if a propeller is to be designed for efficiency, drag eventually being created with the same diameter of propeller due to light or heavy aircraft, design of nose, fuselage, cowling, and other factors.

To make it more clear as to what is meant by "points of radii beyond which air should not and could not be transferred efficiently" at any given linear velocity explanations will now first be given with reference to the illustrations in the drawing.

10 designates a hub that is substantially conical with which the propeller blades 11 are particularly and specifically joined as set forth hereafter.

The leading edge 12 of each of the propeller blades distinctly overlaps or overreaches the hub at the base of the blade and the trailing edge 13 joins the rearmost portion of the hub.

A comparatively evenly curved union is formed between the trailing face or side 14 of the blade and the conical body of the hub 10 as distinctly illustrated and indicated at 15 in Fig. 2; while the leading face or side 16 of the blade, by the fact that the leading edge 12 joins the hub 10 near the front though the trailing edge joins the hub near the rear portion of the hub in the particular manner so that the leading edge 12 overlaps or projects forward, there is a distinct volute curve, beginning with the joining of the leading edge 12 near the front of the hub as indicated at 17 and continuing in its volute form downwardly and partly around the hub to come to a point indicated at 18, being near the rear end of the hub.

When so curving around and downwardly over the hub, this volute curve is clearly the bottom of a channel formed between the leading edge 12 and the rearmost edge 19 of the hub.

This channel entraps the air that approaches about the hub and at points about the central portions of the blades and deflects this air towards the tips of the blades by the fact that the channel continues as indicated at 20 until it disappears at 21 near the trailing edge of the blades.

The air must then be said to have been entrapped beginning from about the point indicated at 17, to continue throughout the channel, past the point indicated at 18, up to about the point indicated at 21; this point 21, in this case being the point of radii beyond which air could not be transferred efficiently, depending on various factors, which, in turn are subject to changes with the revolutions per minute at which the propeller is being operated, more particularly with respect to the linear velocity of such point.

By entrapping air throughout the central portions of the propeller, and transferring such air to points of greater radii of the propeller, thereby practically to a great extent preventing air from passing rearwardly directly back of the central portion, thereby also creating centrifugal currents, results in a low pressure area close behind the propeller, which, of course, is in front of parts following the central portions of the propeller.

This drawing of air from the central portion of the propeller, furthermore, creates also a low pressure area in front of the central portion of the propeller, in addition to the low pressure area created in front of the larger portions of the propeller which is generally accepted as a fact in customarily designed propellers, in which, however, the central area suffers if not designed according to this invention, it being quite commonly accepted as a fact that with inefficiently designed propellers an area of pressure exists in front of the central portion of the propeller, especially in front of an unfavorably designed hub.

The different cross sections shown in Figs. 3 to 9 clearly indicate the change of pitch from the high-lift form near the hub at points of low linear velocity to the low lift form near the tips of the blades at points of high linear velocity at any given revolution per minute.

It is, of course, understood that the linear velocities of the different points of a propeller blade vary with the distance of such points from the center of the propeller at any given revolution per minute.

The larger of the outer portions of a propeller are normally relied upon to produce the greatest amount of force, and these portions are supplied with additional air from the central portion of the propeller by the channel or air deflecting and directing capacities referred to above as far as these larger portions of the propeller can utilize such additional air without creating drag.

However, as stated above a development of drag conditions may be due to several factors, and the above referred-to point cannot be given in certain terms with reference to the length of a propeller blade or to the diameter of propeller, and the continuance of the air-transferring channel can only be stated to be to a point or to points where such a supply of additional air is of advantage and not creating drag, or before it creates drag to an excessive extent.

Having used the term "linear velocity" with respect to certain "points where additional air can be utilized advantageously without creating undue drag" it should be understood to mean in this present case that any point of a propeller moves, in the first place, of course, to some extent in a circular path as far as any rotation of the propeller is concerned, but, it must be clear that any point of a propeller, as far as the term "drag" is concerned, moves in a certain line through air while the aircraft moves in a forward direction, and it should be said to be along a somewhat helical line, due to the combined rotation of the propeller and the forward movement of the aircraft.

No doubt, any point of the propeller moves along a certain line at a certain velocity at any given revolution of the propeller subject to many factors of the aircraft, in other words, it should be said that the "point" moves at a linear velocity, depending on the many factors as already recited.

All such factors, however, are known to a designer of aircraft, or within his powers to establish, as are also conditions at and by which undue drag is created, and a designer will therefore be able to establish such "point" of a propeller that he intends to use, subject to the known factors of the aircraft to be designed.

The term, or phrase—"points where additional air can be utilized advantageously without creating undue drag" should therefore be accepted as a structural detail of the propeller as taught in this case, readily to be computed, calculated, and established by a designer and so applied in and to regular calculations.

I claim:—

1. A propeller having a hub of distinctly conical form larger at the rear, and blades having each a leading edge disposed to overlap the larger rear end of the hub and a trailing edge joining the larger part of the hub in such a manner as to form clear volute channels from the front end of the hub to curve around the hub under the overlapping leading edges of the blades towards the trailing edges, each of the trailing edges having a channeled portion with forwardly projecting deflecting and guiding edges forming continuing channels in communication with said volute channels and extending radially along the trailing edges of the blades to points where the linear velocity and the form of the blades are such that surplus air received from the center of the propeller along the volute and continuing channels can advantageously be made effective and beyond which points any deflecting edges would create excessive and undue drag.

2. A propeller having a central hub and blades with forwardly facing channeled portions along the rear-side trailing edges up to certain points of the blades for deflecting and guiding surplus air from the center of the propeller radially and creating a pressure increase up to such points beyond which a channeled portion would create excessive drag at any linear velocity at which such points may be operated.

3. A propeller having a hub with a rearwardly enlarging body, and blades joining the hub with the leading edges overlapping the enlarging body of the hub and the trailing edges provided with forwardly projecting portions to form a volute channel around the hub and to continue radially along the trailing edges of the blades up to points which reach a linear velocity beyond which a continuation of the forwardly projecting portions would create excessive drag.

4. A propeller having a central hub, and blades with the portions directly joining the hub of distinctly airfoil cross sections with convexed faces in the front designed to create a high-lift area over the front of the propeller at the low linear velocity at such cross sections and having other cross sections gradually diminishing from the high-lift form to comparatively flat forms near the tips of the blades suitable to the higher linear velocities encountered.

5. A propeller having a hub of distinctly conical form larger at the rear, and blades with channeled trailing edges, and leading edges overlapping the larger rear end of the hub so as to form distinct volute channels around the hub from the front to the rear and in communication with the channels in the trailing edges for drawing surplus air from the hub so as to create a high-lift area over the front and creating a pressure increase under the blades up to points beyond which a continuation of the channels in the trailing edges would create excessive drag.

6. A propeller having a hub of distinctly conical form larger at the rear, and blades with substantially airfoil cross sections throughout and particularly immediately adjoining the hub of a form to create a high-lift area over the front at the low linear velocity at such points and gradually diminishing from the high-lift form to comparatively flat form near the tips of the blades suitable to the higher linear velocity encountered, the blades having leading edges disposed to join the smaller end of the hub with forwardly projecting portions distinctly overlapping the larger portion of the hub and having trailing edges joining the larger portion of the hub so as to form distinct volute channels from the front end of the hub towards the rear and adapted to collect air from about the hub so as to deflect it towards the tips of the blades.

7. A propeller having a hub of distinctly conical form larger at the rear, and blades joining the hub so as to form distinct volute channels around the hub and at the rear of the blades and having channeled portions along the trailing edges in communication with the volute channels and extending radially up to points at which the linear velocity assures an advantageous pressure increase.

8. A propeller having a hub of distinctly conical form larger at the rear, and blades joining the hub so as to form distinct volute channels around the hub and at the rear of the blades and having channeled portions along the trailing edges in communication with said volute channels and extending radially up to points at which the linear velocity assures an advantageous pressure increase and beyond which points a continuation of the channeled portions in the trailing edges of the blades would create excessive drag.

LOREN L. MILES.